(12) United States Patent
Lin et al.

(10) Patent No.: US 6,763,078 B2
(45) Date of Patent: Jul. 13, 2004

(54) DEVICE AND METHOD FOR BURST SYNCHRONIZATION AND ERROR DETECTION

(75) Inventors: Shih-Chuan Lin, Keelung (TW); Hsu-Hsiang Tseng, Taoyuan (TW)

(73) Assignee: Syncomm Technology Corp., Taoyuan (TW)

( * ) Notice: Subject to any disclaimer, the term of this patent is extended or adjusted under 35 U.S.C. 154(b) by 743 days.

(21) Appl. No.: 09/742,083

(22) Filed: Dec. 22, 2000

(65) Prior Publication Data

US 2002/0041647 A1 Apr. 11, 2002

(30) Foreign Application Priority Data

Oct. 2, 2000 (TW) ........................................ 89120459 A

(51) Int. Cl.[7] .................................................. H04L 7/00
(52) U.S. Cl. ........................ 375/354; 370/503; 714/775; 714/798
(58) Field of Search ................................ 714/746, 758, 714/774, 775, 789, 798–799; 375/354, 377, 285, 346; 370/503

(56) References Cited

U.S. PATENT DOCUMENTS

| | | | | |
|---|---|---|---|---|
| 5,084,891 A | * | 1/1992 | Ariyavisitakul et al. | 714/775 |
| 5,301,197 A | * | 4/1994 | Yamada et al. | 714/704 |
| 5,651,015 A | * | 7/1997 | Bain | 714/775 |
| 5,715,278 A | * | 2/1998 | Croft et al. | 375/224 |
| 5,745,510 A | * | 4/1998 | Choi | 714/798 |
| 5,832,002 A | * | 11/1998 | Endresen et al. | 714/798 |

* cited by examiner

Primary Examiner—Jean B. Corrielus
(74) Attorney, Agent, or Firm—Birch, Stewart, Kolasch & Birch, LLP

(57) ABSTRACT

This specification provides a burst synchronization and error detection device, which can generate in the synchronization module of the burst synchronization and error detection device a syndrome shared with the error detection module so as to decrease the computation time of the syndrome, shortening the processing time of error detection. The present invention also provides a burst synchronization and error detection method.

12 Claims, 8 Drawing Sheets

| Slippage Value S | Syndrome Pattern (Sn) |
|:---:|:---:|
| n-k-1 | 1,x,x,x,......,x,x,x,x,x,x |
| n-k-2 | 0,1,x,x,x,......,x,x,x,x,x |
| n-k-3 | 0,0,1,x,x,x,......,x,x,x,x |
| n-k-4 | 0,0,0,1,x,x,x,......,x,x,x |
| ⋮ | ⋮ |
| +3 | 0,0,0,......,0,0,0,0,1,x,x,x |
| +2 | 0,0,0,0,0,......,0,0,0,1,x,x |
| +1 | 0,0,0,0,0,0,0,......,0,0,0,1,x |

FIG. 4

DEVICE AND METHOD FOR BURST SYNCHRONIZATION AND ERROR DETECTION

BACKGROUND OF THE INVENTION

1. Field of Invention

The invention relates to a burst synchronization and error detection device and its method. More particularly, it relates to a burst synchronization and error detection device and the method that is utilized in a communication system (such as the PACS system) using the time-division multiplexing/time division multiplex access (TDM/TDMA) technique.

2. Related Art

In a time-division multiplexing/time division multiplex access (TDM/TDMA) digital communication system, the receiving device is mostly designed with a burst synchronization and error detection device so that when slippage or errors occurs to a burst, the transmitted signal can be synchronized and the errors can be detected.

When the above-mentioned burst synchronization and error detection device performs synchronization and error detection, the cyclic code technique is often used. There is much relevant literature describing such a technique; see, for example, Tavares et. al., "*Synchronization of cyclic codes in the presence of burst errors*" Information and Control, vol. 14 (1969), PP. 423–441.

Since burst slippage is more serious during the transmission of wireless digital signal, the U.S. Pat. No. 5,084,891 "Technique for jointly performing bit synchronization and error detection in a TDM/TDAM system" (January 1992) and the R.O.C. Pat. No. 84,113,269 were proposed to solve this problem. As shown in FIG. 1, the synchronization and error detection device of the system disclosed in the above-mentioned U.S. patent contains a synchronization module (loop) 91 and an error detection module 92. The synchronization module 91 and the error detection module 92 generate a tagged bit-sequence using an adder 911, 921 and compute a syndrome using a g (x) divider 912, 922, respectively. As demonstrated in the patent, this can solve the burst slippage problem and detect errors, but the synchronization module 91 and the error detection module 92 need to use a divider to process synchronization and error detection. Therefore, the computation takes longer to complete and the microprocessor in the receiving device spares less time for performing other operations. Similarly, the R.O.C. Pat. No. 84,113,269 has the same problem. Accordingly, how to shorten the processing time of synchronization and error detection so that the processor of the receiving device can have more time to do other operations is a very important subject.

SUMMARY OF THE INVENTION

In view of the foregoing, it is a primary object of the invention to provide a burst synchronization and error detection device to more efficiently perform burst synchronization and error detection so as to shorten the processing time.

The invention is characterized in that a syndrome to be shared with the error detection module is generated by the synchronization module of the burst synchronization and error detection device, whereby the syndrome computation time can be reduced in order to shorten the processing time for error detection.

To achieve the above objectives, the burst synchronization and error detection device of the invention comprises a codeword separation module, a message appending module, a first syndrome generating module, a second syndrome generating module, a burst synchronization bit generating module, a tagging module, an error detection slippage module, and an error flag generating module. The codeword separation module receives an n-bit codeword and separates the n-bit codeword into a k-bit (n>k) and an (n−k)-bit sequence. The message appending module receives the k-bit sequence output from the codeword separation module and appends (n−k) bits of "0" after the k-bit sequence so as to generate an n-bit message appended bit sequence. The first syndrome generating module receives the message appended bit sequence and computes a first syndrome of the message appended bit sequence. The second syndrome generating module generates a second syndrome according to the first syndrome and the (n−k)-bit sequence. The burst synchronization bit generating module outputs a synchronized burst synchronization bit sequence according to the second syndrome. The tagging module receives the synchronization bit sequence and generates a tagged synchronization bit sequence. The error detection slippage module receives the tagged synchronization bit sequence and generates an (n−k)-bit error detection bit sequence for error detection purposes. The error flag generating module generates an error flag value according to the error detection bit sequence and the first syndrome and outputs the error flag value for determining if the received codeword has any error.

Since the first syndrome generated by the first syndrome generating module of the burst synchronization and error detection device can be directly used by the error flag generating module without further calculation, the invention can therefore shorten the error detection processing time.

BRIEF DESCRIPTION OF THE DRAWINGS

The invention will become more fully understood from the detailed description given in the herein below illustration only, and thus are not limitative of the invention, and wherein:

FIG. 4 is a table of the relation between the syndrome sample and the slippage value in the invention;

DETAILED DESCRIPTION OF THE INVENTION

The invention will be apparent from the following detailed description, which proceeds with reference to the accompanying drawings, wherein the same references relate to the same elements.

Since the invention mainly uses the features of the binary cyclic codes and the concept of polynomial calculations, therefore for the convenience of later uses they will be first explained before an explicit description of a preferred embodiment of the invention.

The cyclic code is an important linear block code with a stringent algebra structure. Its property is easy to be analyzed and realized in an encoding circuit. Suppose C is a linear block code, then the codeword in C can be represented as $c=(c_0,c_1,\ldots,c_{n-1})$. If $c'=(c_{n-1},c_0,c_1,\ldots,c_{n-2})$ obtained by cyclically permuting c arbitrarily times is also a codeword in C, then C forms a cyclic code.

A codeword with a length n (n bits) $c=(c_0,c_1,\ldots,c_{n-1})$ can be represented by the coefficients of an (n−1)th order polynomial:

$$c(x)=c_0+c_1x+\ldots+c_{n-1}x^{n-1}.$$

We call c(x) a codeword polynomial or a code polynomial for short. Many operational concepts in the following description will be explained by using the concepts of polynomial multiplication and division. Since such concepts are well known, therefore, unless necessary, the detailed explanation will be omitted hereinafter.

Figure 1:
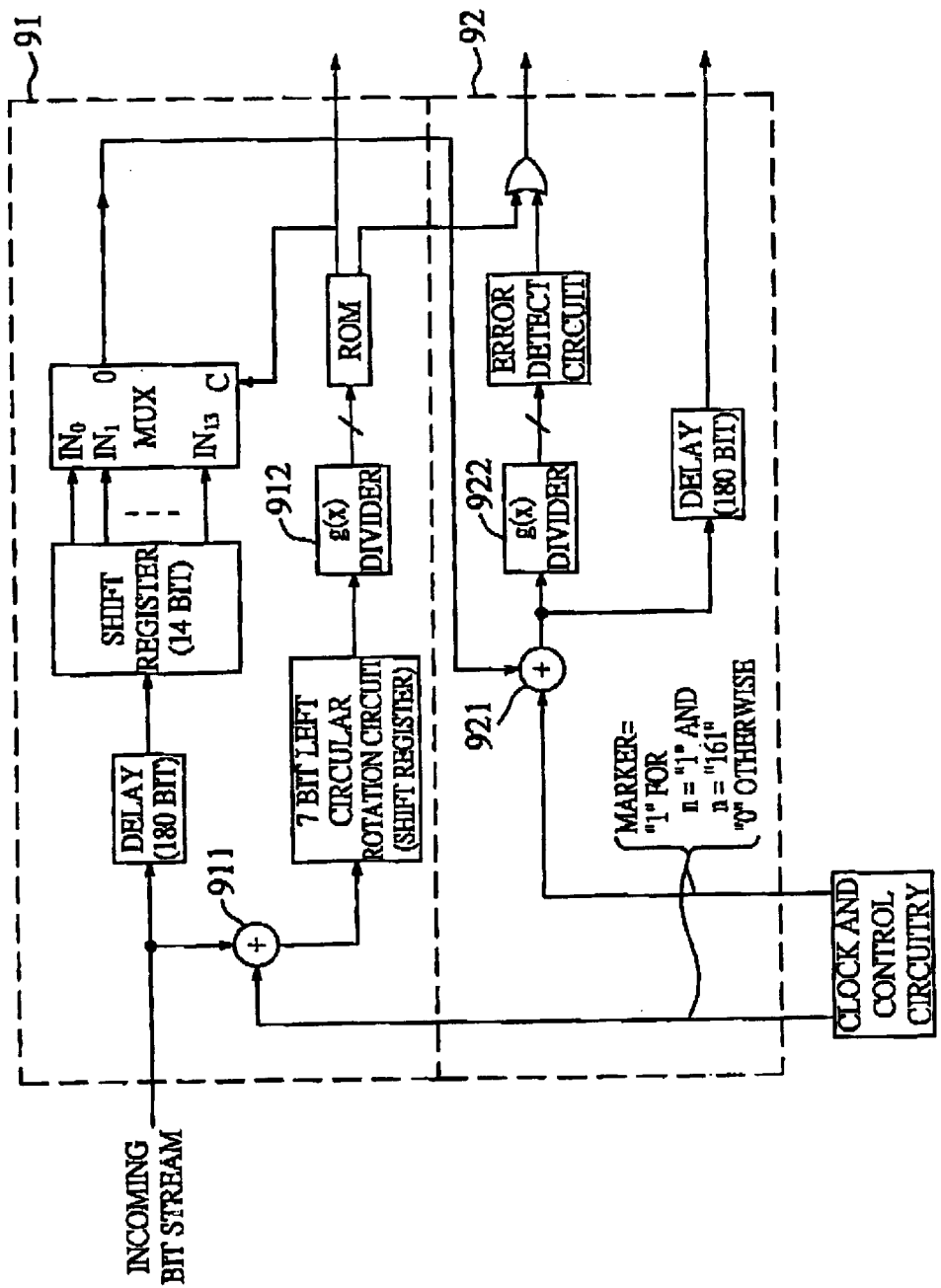
FIG. 1 is a circuit block diagram of a conventional burst synchronization and error detection device.
Figure 2:
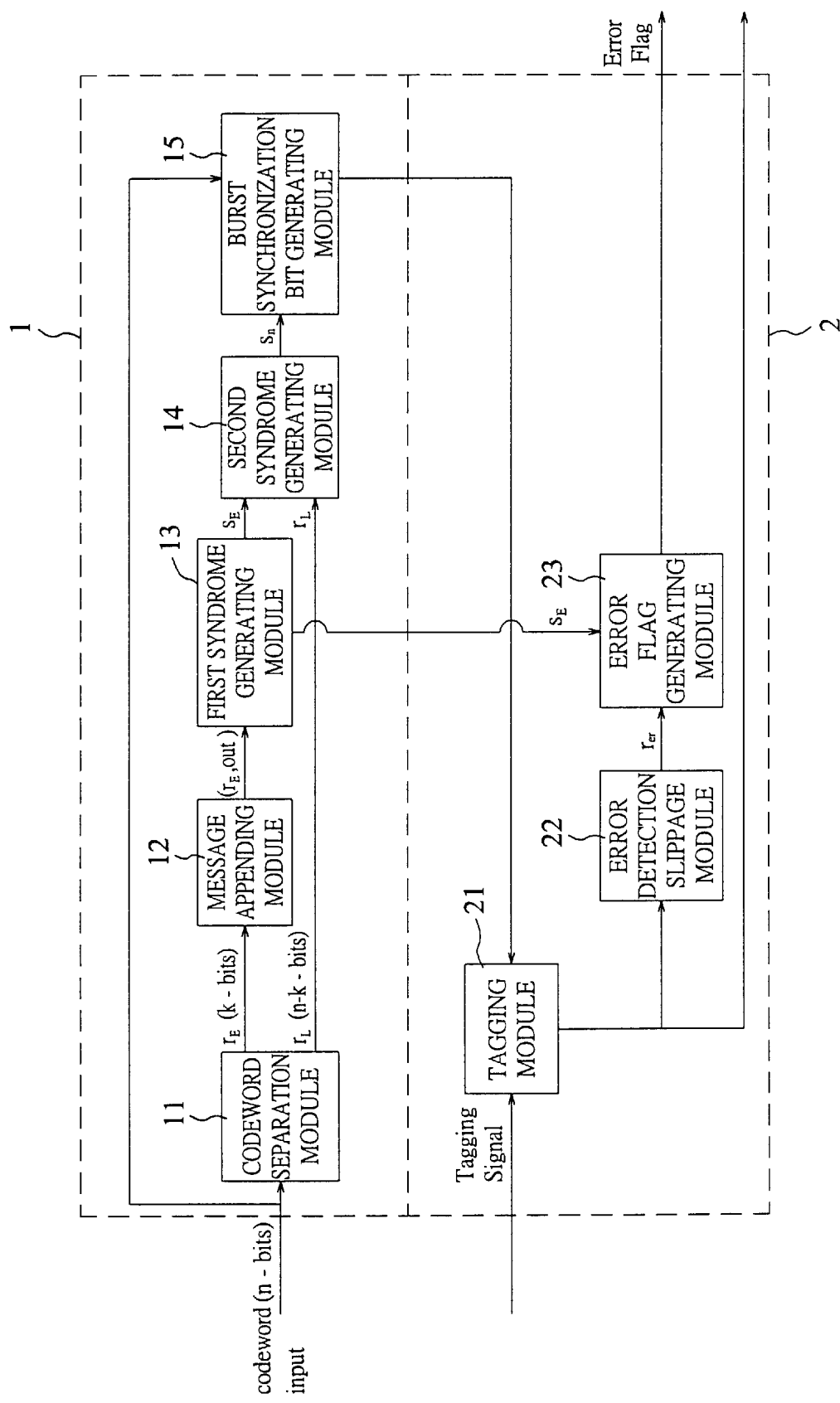
FIG. 2 is a compositional block diagram of a burst synchronization and error detection device according to a preferred embodiment of the invention.

With reference to FIG. 2, the disclosed burst synchronization and error detection device contains a synchronization module 1 and an error detection module 2. The synchronization module 1 includes a codeword separation module 11, a message appending module 12, a first syndrome generating module 13, a second syndrome generating module 14, and a burst synchronization bit generating module 15. The error detection module 2 includes a tagging module 21, an error detection slippage module 22, and an error flag generating module 23.

As shown in FIG. 2, the codeword separation module 11 receives an n-bit codeword and separates the n-bit codeword into a k-bit sequence (n>k) and an (n−k)-bit sequence. The k-bit sequence and the (n−k)-but sequence are represented by $r_E$, $r_L$ with $r_E=(r_0,r_1,\ldots,r_{k-1})$ and $r_L=(r_k,r_{k+1},\ldots,r_{n-1})$. In the current embodiment, the codeword separation module 11 receives a 105-bit codeword and separates it into a 90-bit sequence and a 15-bit sequence. That is, $r_E$ is the 90-bit sequence and $r_L$ is the 15-bit sequence.

The message appending module 12 receives the k-bit sequence output from the codeword separation module 11 and appends n−k bits of "0" to the end of the k-bit sequence to generate an n-bit message appended bit sequence. In other words, the message appended bit sequence can be represented by $(r_E,0_{n-k})$, where $0_{n-k}$ stands for a sequence of n−k "0".

The first syndrome generating module 13 receives the message appended bit sequence $(r_E,0_{n-k})$ and computes a first syndrome $S_E$ of the message appended bit sequence. In the current embodiment, the first syndrome $S_E$ is generated by dividing the message appended bit sequence $(r_E,0_{n-k})$ by a generator polynomial g(x) with the remainder as the first syndrome $S_E$. The function g(x) is a 15(n−k)th order polynomial.

Figure 3:
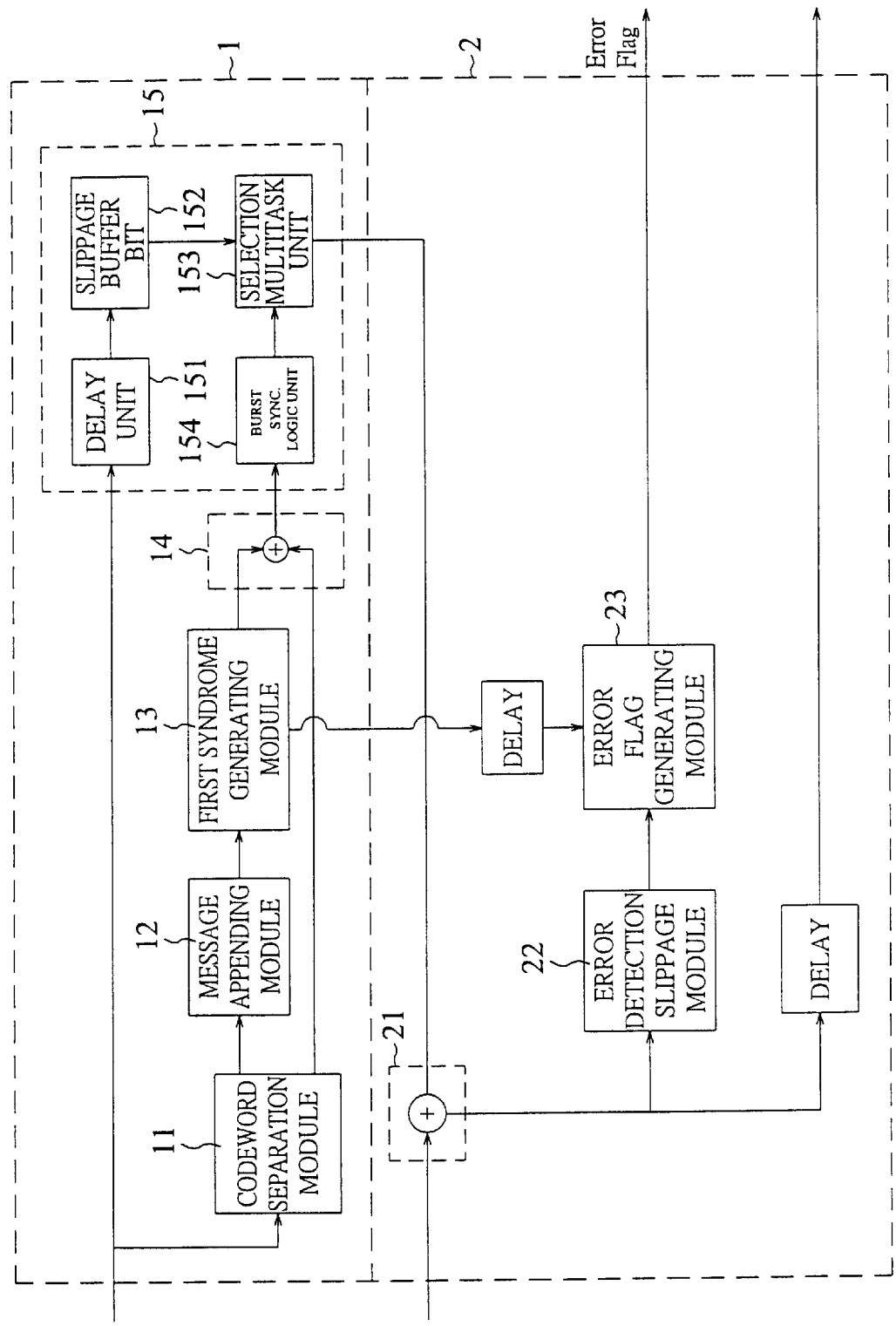
FIG. 3 is a detailed compositional block diagram of a burst synchronization and error detection device according to a preferred embodiment of the invention.

The second syndrome generating module 14 generates a second syndrome Sn according to the first syndrome $S_E$ and the (n−k)-bit sequence $r_L$. With reference to FIG. 3, the second syndrome generating module 14 in the current embodiment can be effectively an adder. The adder takes the sum of the $S_E$ output from the first syndrome generating module 13 and the $r_L$ output from the codeword separation module 11 to generate a second syndrome Sn. In terms of mathematical formulas, $Sn=S_E+r_L$. It should be noted that since $r_L$ has (n−k−1) powers, which is smaller than the (n−k) powers in g(x), the syndrome of $r_L$ is $r_L$ itself.

The burst synchronization bit generating module 15 outputs a synchronized burst synchronization codeword according to the second syndrome Sn. With reference to FIG. 3, the burst synchronization bit generating module 15 in the embodiment includes a delay unit 151, a slippage buffer unit 152, a selection multitask unit 153, and a burst synchronization logic unit 154. The actions of the delay unit 151, the slippage buffer unit 152 and the selection multitask unit 153 are similar to the prior art and thus are not repeated herein. Also, the delayer in FIG. 3 is similar to the prior art and not further explained either. The burst synchronization logic unit 154 obtains a slippage value S corresponding to the second syndrome Sn using the second syndrome Sn and the table (to be described later) given in FIG. 4. The slippage value S controls the output of the selection multitask unit 153. In the current embodiment, the slippage value S means that the received codeword arrives early by S bits, i.e., $(r_{-S},r_{-S+1},\ldots r_{-2},r_{-1})$ shown in FIG. 5.

Figure 5:
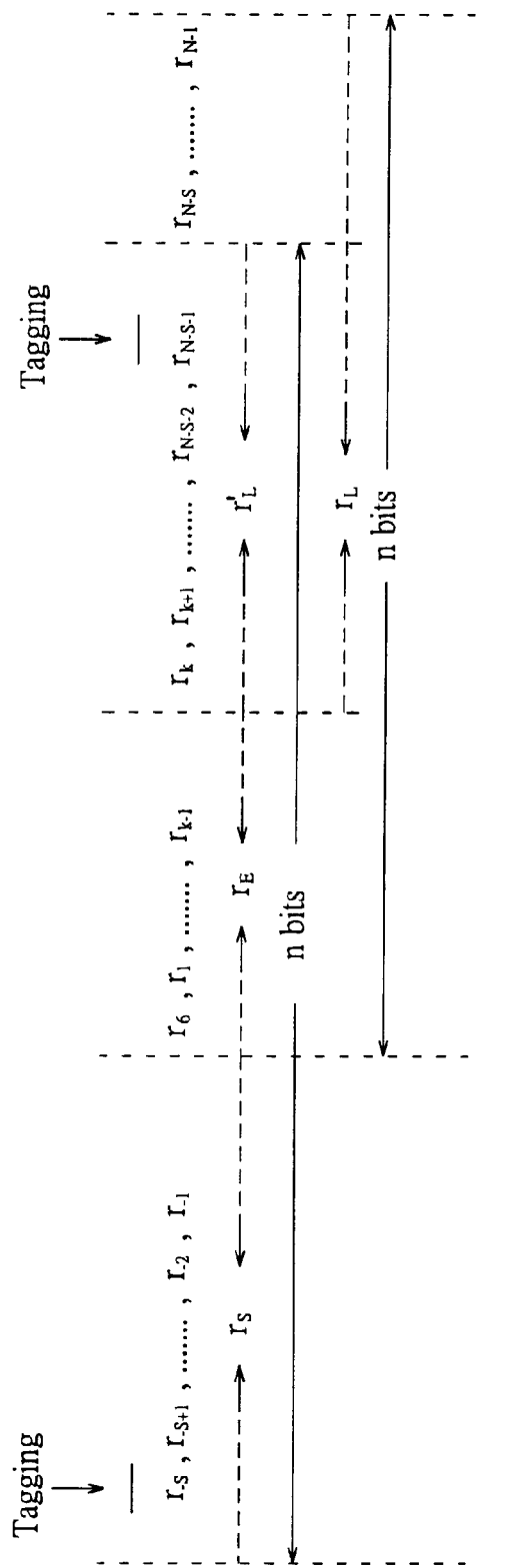
FIG. 5 illustrates a tagged bit sequence.

The tagging module 21 receives the burst synchronization bit sequence and generates a tagged burst synchronization codeword. In the current embodiment, the tagging module 21 is essentially consisted of an adder, as shown in FIG. 3. It adds the received synchronization bit sequence $(r_{-S},r_{-S+1},\ldots r_{-2},r_{-1},r_0,r_1,\ldots,r_{n-s-1})$ and the tagging signal entered from the exterior to generate a tagged burst synchronization bit sequence $(\overline{r_{-s}},r_{-s+1},\ldots r_{-2},r_{-1},r_0,r_1,\ldots,\overline{r_{n-s-1}})$, as shown in FIG. 5.

Figure 6:
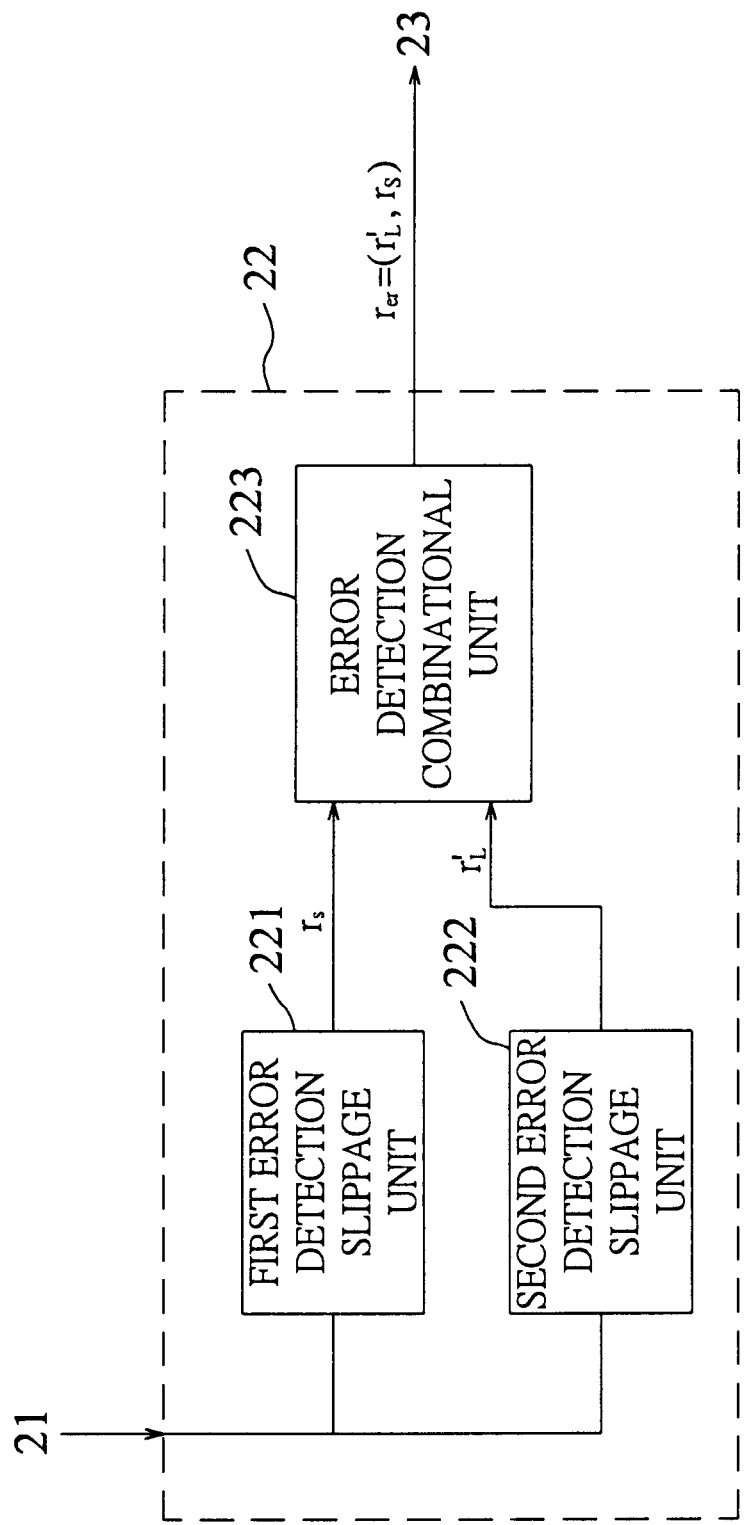
FIG. 6 is a compositional block diagram of an error detection slippage device of the invention.

The error detection slippage module 22 receives the tagged synchronization bit sequence output from the tagging module 21 so as to generate an (n−k)-bit error detection bit sequence $r_{er}$ for error detection purposes. In the current embodiment, the error detection slippage module 22 includes a first error detection slippage unit 221, a second error detection slippage unit 221, and an error detection combination unit 223, as shown in FIG. 6. The first error detection slippage unit 221 shifts the tagged synchronization bit sequence $(\overline{r_{-s}},r_{-s+1},\ldots r_{-2},r_{-1},r_0,r_1,\ldots,\overline{r_{n-s-1}})$ by S bits to obtain a first error detection bit sequence $r_s$, $(\overline{r_{-s}},r_{-s+1},\ldots r_{-2},r_{-1})$. The second error detection slippage unit 222 also shifts $r_L$ by S bits to obtain a second error detection bit sequence $r_L{}'$, $(r_k,r_{k+1},\ldots,\overline{r_{n-s-1}})$. The error detection combination unit 223 combines $r_s$ and $r_L$ to generate an (n−k)-bit error detection bit sequence $r_{er}$. In other words, $r_{er}=(r_L{}', r_s)$.

The error flag generating module 23 generates an error flag value according to the error detection bit sequence $r_{er}$ and the first syndrome $S_E$. In the current embodiment, $r_{er}=S_E$ means that there is no error and the error flag generating module 23 outputs an error flag value representing no error. If $r_{er}+S_E$ is not $0_{n-k}$, then an error flag value representing an error is output for the next device to perform operations.

It should be explained why $r_{er}=S_E$ means no error. With further reference to FIG. 5, if $(r_s, r_E, r_L{}')$ is a codeword without any error, the syndrome should be $0_{n-k}$. According to the property of the cyclic code, $(r_E, r_L{}', r_s)$ is also an error-free codeword with the syndrome $0_{n-k}$. Since the syndrome of $(r_E, r_L{}', r_s)$ is $S_E+r_{er}$, therefore $S_E+r_{er}=0_{n-k}$. Due to the nature of the binary addition operation, we get $r_{er}=S_E$.

From the above description, one can learn that the burst synchronization and error detection device of the invention directly feeds $S_E$ computed in the synchronization module 1 to the error detection module 2 without further calculation, thus saving much of the computation time.

The burst synchronization and error detection method of the invention will be described hereinafter with reference to FIGS. 7 and 8. Since the techniques used in the burst synchronization and error detection method are basically the same as those used in the burst synchronization and error detection device, relevant techniques will be omitted hereinafter.

Figure 7:
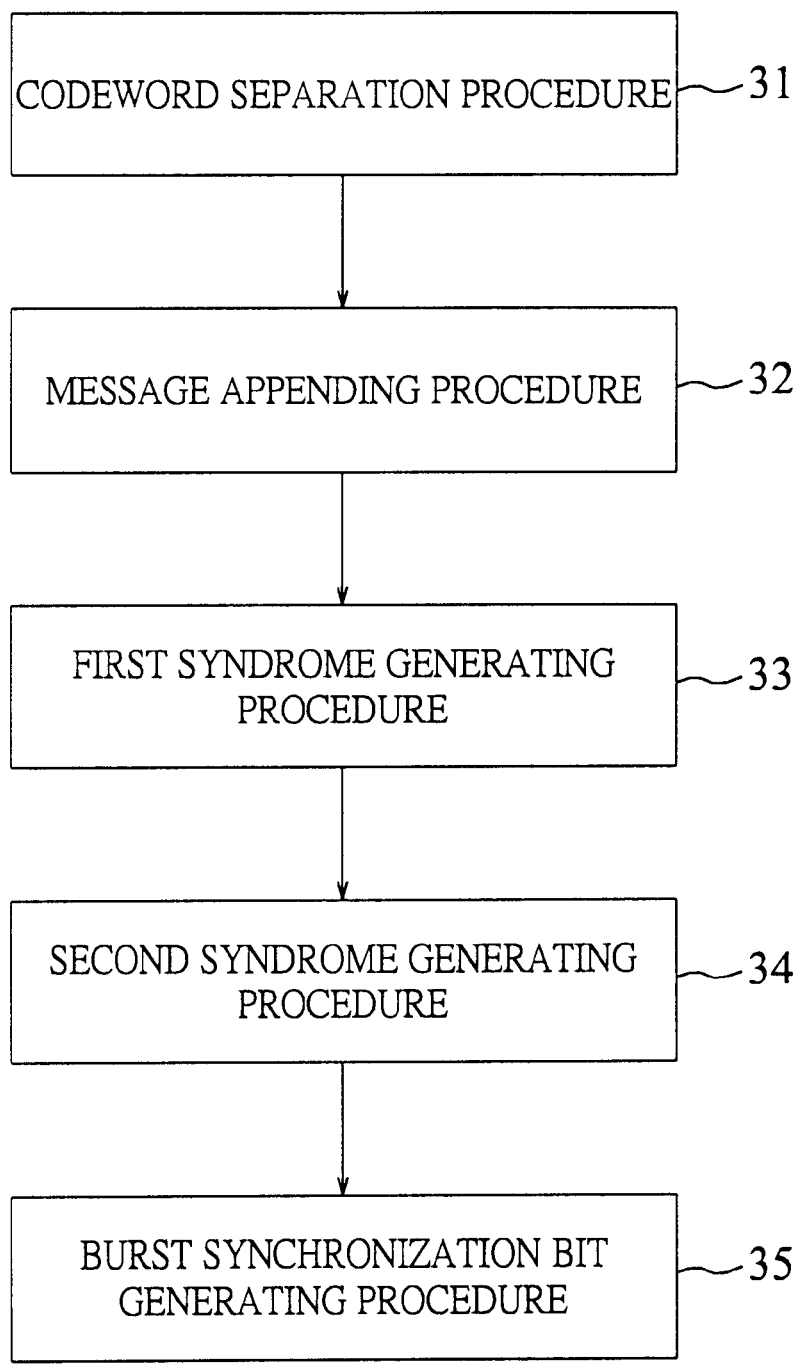
FIG. 7 is an illustrative diagram showing the procedure of the burst synchronization and error detection method of the invention.

As shown in FIG. 7, the burst synchronization and error detection method of the invention includes a codeword separation procedure 31, a message appending procedure 32, a first syndrome generating procedure 22, a second syndrome generating procedure 34, and a burst synchronization bit generating procedure 35.

The codeword separation procedure 31 separates a received n-bit codeword into a k-bit sequence and an (n–k)-bit sequence. The message appending procedure 32 appends to the end of the k-bit sequence n–k bits of "0" to generate an n-bit message appended bit sequence. The first syndrome generating procedure 33 computes a first syndrome of the message appending bit sequence according to the message appending bit sequence. The second syndrome generating procedure 34 generates a second syndrome according to the first syndrome and the (n–k)-bit sequence. The burst synchronization bit generating procedure 35 outputs a synchronized burst synchronization bit sequence according to the second syndrome.

Figure 8:
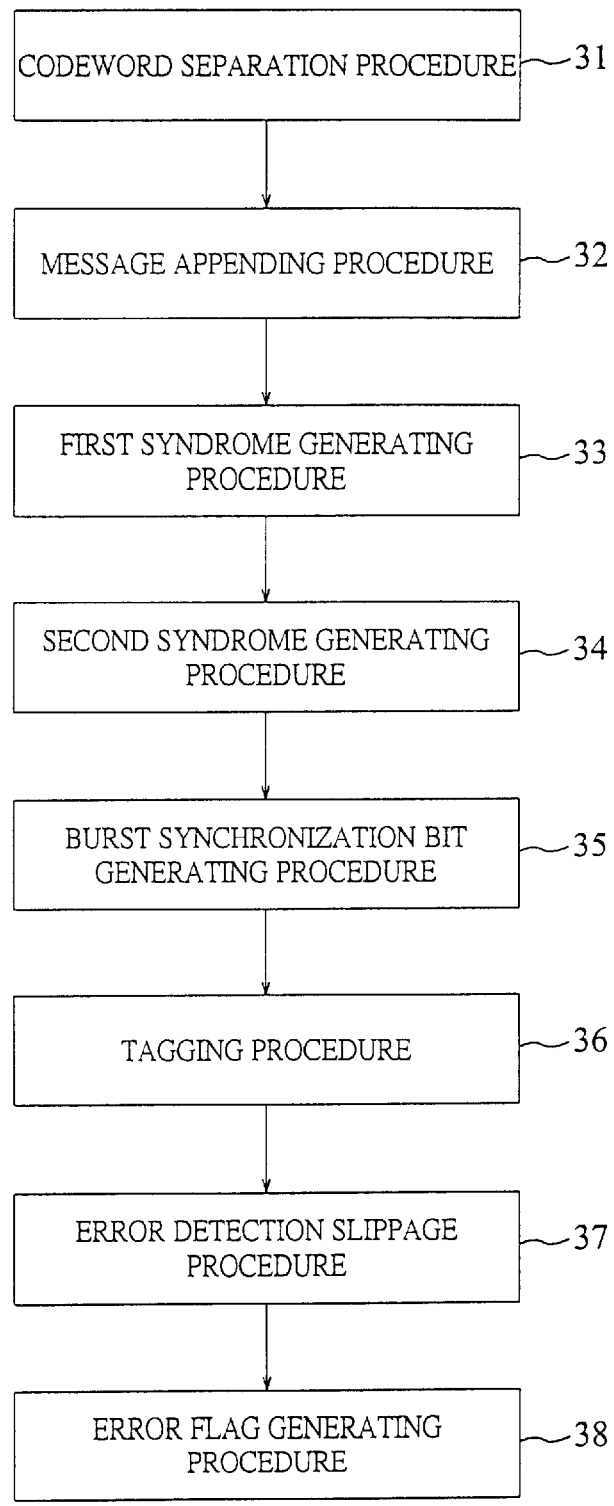
FIG. 8 is another illustrative diagram showing the procedure of the burst synchronization and error detection method of the invention.

As shown in FIG. 8, the burst synchronization and error detection method further includes a tagging procedure 36, an error detection slippage procedure 37, and an error flag generating procedure 38. The tagging procedure 36 adds a tag to the synchronization bit sequence to generate a tagged synchronization bit sequence. The error detection slippage procedure 37 generates according to the tagged synchronization bit sequence generated in the tagging procedure an (n–k)-bit error detection bit sequence for error detection purposes. The error flag generating procedure 38 generates an error flag value according to the error detection bit sequence and the first syndrome and outputs the error flag value for determining if the received codeword contains any error.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A burst synchronization and error detection device comprising:
   a codeword separation module, which receives an n-bit codeword and separates the n-bit codeword into a k-bit (n>k) and an (n–k)-bit sequence;
   a message appending module, which receives the k-bit sequence output from the codeword separation module and appends (n–k) bits of "0" to the end of the k-bit sequence so as to generate an n-bit message appended bit sequence;
   a first syndrome generating module, which receives the message appended bit sequence and computes a first syndrome of the message appended bit sequence;
   a second syndrome generating module, which generates a second syndrome according to the first syndrome and the (n–k)-bit sequence;
   a burst synchronization bit generating module, which outputs a synchronized burst synchronization bit sequence according to the second syndrome;
   a tagging module, which receives the synchronization bit sequence and generates a tagged synchronization bit sequence;
   an error detection slippage module, which receives the tagged synchronization bit sequence and generates an (n–k)-bit error detection bit sequence for error detection purposes; and
   an error flag generating module, which generates an error flag value according to the error detection bit sequence and the first syndrome and outputs the error flag value for determining if the received codeword has any error.

2. The device of claim 1, wherein the first syndrome generating module comprises an adder.

3. The device of claim 1, wherein the second syndrome generating module comprises an adder.

4. The device of claim 1, wherein the burst synchronization bit generating module comprises a delay unit, a slippage buffer unit, a selection multitask unit and a burst synchronization logic unit, the burst synchronization logic unit obtaining a slippage value corresponding to the second syndrome according to the second syndrome and controls the output of the selection multitask unit using the slippage value.

5. The device of claim 1, wherein the tagging module comprises an adder.

6. The device of claim 1, wherein the error detection slippage module comprises a first error detection slippage unit, a second error detection slippage unit, and an error detection combination unit, the error detection combination unit generating the error detection bit sequence according to a first error detection bit sequence and a second error detection bit sequence generated by the first error detection slippage unit and the second error detection slippage unit, respectively.

7. The device of claim 1, wherein n=105.

8. The device of claim 1, wherein k=90.

9. A burst synchronization and error detection device comprising a synchronization module and an error detection module, wherein the synchronization module includes:
   a codeword separation module, which receives an n-bit codeword and separates the n-bit codeword into a k-bit (n>k) and an (n–k)-bit sequence;
   a message appending module, which receives the k-bit sequence output from the codeword separation module and appends (n–k) bits of "0" to the end of the k-bit sequence so as to generate an n-bit message appended bit sequence;
   a first syndrome generating module, which receives the message appended bit sequence and computes a first syndrome of the message appended bit sequence; and
   a second syndrome generating module, which generates a second syndrome according to the first syndrome and the (n–k)-bit sequence;
   the synchronization module performing synchronization using the second syndrome and the error detection module performing error detection using the first syndrome.

10. The device of claim 9, wherein the error detection module comprises:
   a tagging module, which receives the synchronization bit sequence and generates a tagged synchronization bit sequence;
   an error detection slippage module, which receives the tagged synchronization bit sequence output from the tagging module and generates an (n–k)-bit error detection bit sequence for error detection purposes thereby; and
   an error flag generating module, which generates an error flag value according to the error detection bit sequence and the first syndrome and outputs the error flag value for determining if the received codeword contains any error.

11. A burst synchronization and error detection method comprising:
- a codeword separation procedure, which separates a received n-bit codeword into a k-bit sequence (n>k) and an (n−k)-bit sequence;
- a message appending procedure, which appends n−k bits of "0" to the end of the k-bit sequence to generate an n-bit message appended bit sequence;
- a first syndrome generating procedure, which computes a first syndrome of the message appended bit sequence according to the message appended bit sequence;
- a second syndrome generating procedure, which generates a second syndrome according to the first syndrome and the (n−k)-bit sequence; and
- a burst synchronization bit generating procedure, which outputs a synchronized burst synchronization bit sequence according to the second syndrome.

12. The method of claim 11 further comprising:
- a tagging procedure, which adds a tag to the synchronization bit sequence to generate a tagged synchronization bit sequence;
- an error detection slippage procedure, which generates an (n−k)-bit error detection bit sequence for error detection purposes according to the tagged synchronization bit sequence generated in the tagging procedure; and
- an error flag generating procedure, which generates an error flag value according to the error detection bit sequence and the first syndrome and outputs the error flag value for determining if the received codeword contains any error.

* * * * *